(12) United States Patent
Rhee et al.

(10) Patent No.: US 9,826,556 B2
(45) Date of Patent: Nov. 21, 2017

(54) APPARATUS AND METHOD FOR DATA TRANSMISSION AND RECEPTION OF A MOBILE TERMINAL

(71) Applicant: Samsung Electronics Co., Ltd., Gyeonggi-do (KR)

(72) Inventors: In-Jong Rhee, Gyeonggi-do (KR); Young-Kyoo Kim, Seoul (KR); Dong-Ho Jang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 91 days.

(21) Appl. No.: 14/103,249

(22) Filed: Dec. 11, 2013

(65) Prior Publication Data

US 2014/0160997 A1   Jun. 12, 2014

(30) Foreign Application Priority Data

Dec. 11, 2012   (KR) .................. 10-2012-0143331

(51) Int. Cl.
| | |
|---|---|
| *H04W 76/00* | (2009.01) |
| *H04W 4/06* | (2009.01) |
| *H04W 4/20* | (2009.01) |
| *H04L 29/06* | (2006.01) |

(52) U.S. Cl.
CPC ....... *H04W 76/002* (2013.01); *H04L 65/1089* (2013.01); *H04L 65/403* (2013.01); *H04L 65/605* (2013.01); *H04W 4/06* (2013.01); *H04W 4/206* (2013.01)

(58) Field of Classification Search
CPC ..... H04W 76/002; H04W 4/206; H04W 4/06; H04L 65/403; H04L 65/1089; H04L 65/605; H04L 29/06414
USPC .......... 370/260, 261, 328, 338, 401
See application file for complete search history.

(56) References Cited

U.S. PATENT DOCUMENTS

| | | | |
|---|---|---|---|
| 4,829,554 A * | 5/1989 | Barnes et al. ............. | 455/432.1 |
| 2005/0233778 A1 | 10/2005 | Rodman et al. | |
| 2006/0215585 A1* | 9/2006 | Taniwaki ...................... | 370/260 |
| 2008/0101564 A1* | 5/2008 | Araki .......................... | 379/90.01 |
| 2009/0011772 A1* | 1/2009 | Choi et al. ................. | 455/456.1 |
| 2009/0168985 A1* | 7/2009 | Yu et al. .................... | 379/202.01 |
| 2010/0296418 A1* | 11/2010 | You et al. .................... | 370/261 |
| 2013/0024912 A1* | 1/2013 | Jeon ................................ | 726/4 |

* cited by examiner

*Primary Examiner* — Christine Ng
(74) *Attorney, Agent, or Firm* — The Farrell Law Firm, P.C.

(57) ABSTRACT

An apparatus and a method are provided for data transmission and reception of a mobile terminal, which seamlessly provide data transmission and reception between the mobile terminal and a multipoint communication device. The method includes requesting, by the mobile terminal, data sharing from another mobile terminal, for sharing of data transmitted and received to and from the another mobile terminal; receiving approval of the request for the data sharing from the another mobile terminal; establishing a channel connection between the mobile terminal and a sharing device for the sharing of the data; and transmitting and receiving the data to and from the sharing device through the channel.

10 Claims, 10 Drawing Sheets

APPARATUS AND METHOD FOR DATA TRANSMISSION AND RECEPTION OF A MOBILE TERMINAL

PRIORITY

This application claims priority under 35 U.S.C. §119(a) to Korean Application Serial No. 10-2012-0143331, which was filed in the Korean Intellectual Property Office on Dec. 11, 2012, the entire content of which is hereby incorporated by reference.

BACKGROUND OF THE INVENTION

1. Field of the Invention

The present invention relates generally to a mobile terminal, and more particularly, to an apparatus and a method for data transmission and reception between a mobile terminal and a multipoint communication device.

2. Description of the Related Art

Often, when a user of a mobile terminal wants to share an on-going phone call between the user and a counterpart with a plurality of additional participants, i.e., wants to enter into a conference call, the user will disconnect the on-going phone call, connect the mobile terminal with a multipoint communication device, and then attempt to re-establish the call in order to share the phone call with all of the participants through the multipoint communication device, which is inconvenient to the user. For example, multipoint communication devices are often used in conference rooms of companies, government agencies, schools, etc.

Alternatively, several users may participate in the call by using a speaker phone function of the mobile terminal. However, when people share a phone call, i.e., perform a conference call, by using the speaker phone function of the mobile terminal, the quality of the call is often insufficient because the microphone and speaker of the mobile terminal used during the speaker phone function are not capable of servicing all of the people or the large area of a conference room.

SUMMARY OF THE INVENTION

Accordingly, the present invention has been made to at least partially solve, reduce, or remove at least one of the problems and/or shortcomings of the related art, and to provide the advantages below.

An aspect of the present invention is to provide a mobile terminal and a method for seamlessly providing data transmission and reception between the mobile terminal and a multipoint communication device.

Another aspect of the present invention is to provide a data convertor and a method for seamlessly providing data transmission and reception between a mobile terminal and a multipoint communication device.

In accordance with an aspect of the present invention, a method for data transmission and reception of a mobile terminal is provided. The method includes requesting, by the mobile terminal, data sharing from another mobile terminal, for sharing of data transmitted and received to and from the another mobile terminal; receiving approval of the request for the data sharing from the another mobile terminal; establishing a channel connection between the mobile terminal and a sharing device for the sharing of the data; and transmitting and receiving the data to and from the sharing device through the channel.

In accordance with another aspect of the present invention, an apparatus for data transmission and reception of a mobile terminal is provided. The apparatus includes a controller configured to request data sharing from another mobile terminal, for sharing data transmitted and received to and from the another mobile terminal, receive approval of the request for the data sharing, and establish a channel connection between the mobile terminal and a sharing device for the sharing of the data; and a transceiver configured to transmit and receive the data to and from the sharing device through the channel connection.

In accordance with another aspect of the present invention, a method of converting data transmitted and received to and from a mobile terminal is provided. The method includes determining a type of data received from the mobile terminal; converting the determined data into a data format suitable for a port of an output terminal; and outputting the converted data through the port of the output terminal.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, an apparatus and method are provided for data transmission and reception of a mobile terminal, which seamlessly provide data transmission and reception between the mobile terminal and a multipoint communication device. Therefore, a user can easily and conveniently share data with a plurality of people, i.e., perform a conference call, using a multipoint communication device, without having to break off data on-going transmission and reception.

Further, according to another embodiment of the present invention, when a user wants to make a call through an existing wired telephone or a multipoint communication device, where a phone number to be called is stored in a user's mobile terminal, the user simply connects the mobile terminal to a device with which the user wants to communicate, thereby conveniently inputting phone numbers without a change of the mobile terminal or conference equipment.

Figure 1:
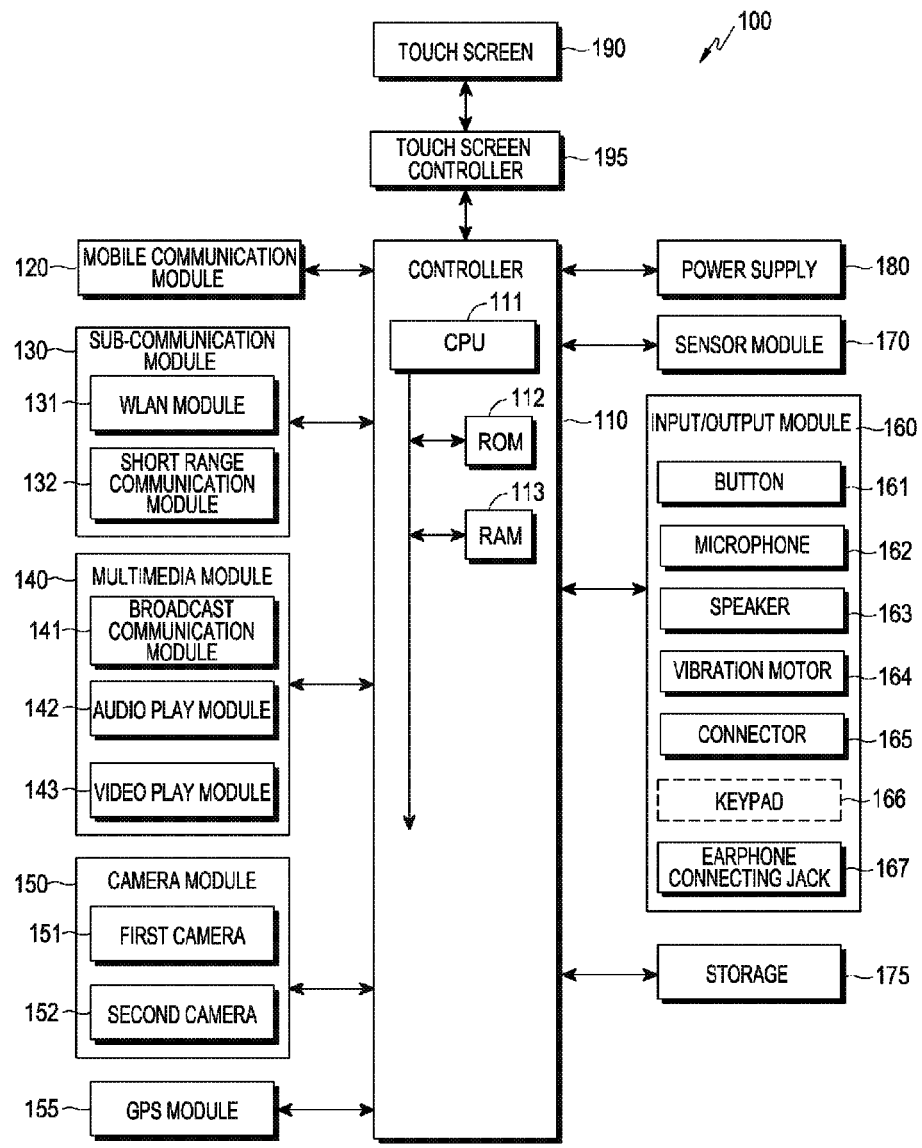
FIG. 1 illustrates a mobile terminal according to an embodiment of the present invention.

FIG. 1 illustrates a mobile terminal according to an embodiment of the present invention.

Referring to FIG. 1, a mobile terminal 100 includes external device connectors, i.e., a sub-communication module 130, a connector 165, and an earphone connecting jack 167, for connecting with an external device (not shown), such as conference call equipment. The external device may include various devices such as earphones, an external speaker, a universal serial bus (USB) memory, a charger, a cradle/dock, a mobile payment related device, a health care device (such as a blood sugar measuring device), a game machine, a vehicle navigation device, etc., which may be detachably connected to the mobile terminal 100 in a wired manner, connected through near field communication such as Bluetooth communication, Near Field Communication (NFC), a Wi-Fi Direct communication, etc., or connected to the mobile terminal 100 in a wireless manner through a wireless Access Point (AP). Further, the external device may include other mobile terminals, a cell phone, a smart phone, a tablet Personal Computer (PC), a desktop PC, a server, etc.

The mobile terminal 100 may be a smart phone, a cellular phone, a game machine, a television, a display device, a head unit for vehicles, a notebook computer, a laptop computer, a tablet PC, a Personal Media Player (PMP), or a Personal Digital Assistants (PDA).

The mobile terminal 100 includes a touch screen 190, a touch screen controller 195, a controller 110, a mobile communication module 120, a sub-communication module 130, a multimedia module 140, a camera module 150, a Global Positioning System (GPS) module 155, an input/output module 160, a sensor module 170, a storage unit 175, and a power supply unit 180. The sub-communication module 130 includes a wireless LAN module 131 and a short range communication module 132, and the multimedia module 140 includes a broadcasting communication module 141, an audio playback module 142, and a video playback module 143. The camera module 150 includes a first camera 151 and a second camera 152, and the input/output module 160 includes a button 161, a microphone 162, a speaker 163, a vibration motor 164, a connector 165, a keypad 166, and an earphone connecting jack 167.

The controller 110 includes a Central Processing Unit (CPU) 111, a Read Only Memory ROM 112 in which control programs for control of the mobile terminal 100 are stored, and a Random Access Memory RAM 113 that stores signals or data input from the outside of the mobile terminal 100 or is used as a memory area for operations performed in the mobile terminal 100.

The controller 110 controls the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195.

Herein, the mobile communication module 120, the sub-communication module 130, and the broadcasting communication module 141 of the multimedia module 140 may be commonly referred to as "a communication unit." The communication unit provides a direct connection with an external device, or a connection with an external device through a network, and may be a wired or wireless communication unit.

The mobile communication module 120 allows the mobile terminal 100 to be connected with an external device through mobile communication by using at least one antenna (not shown) under the control of the controller 110. The mobile communication module 120 transmits and receives wireless signals for a data exchange or one-way transmission or reception, such as a voice call, a video call, a Short Message Service (SMS), or a Multimedia Message Service (MMS).

The sub-communication module 130 includes the wireless LAN module 131 and the short range communication module 132. Alternatively, the sub-communication module 130 may include only the wireless LAN module 131, or only the short range communication module 132.

The wireless LAN module 131 connects to the internet, via a wireless AP, under the control of the controller 110. For example, the wireless LAN module 131 supports a wireless LAN protocol (IEEE802.11x) of the Institute of Electrical and Electronics Engineers (IEEE). The short range communication module 132 performs near field communication in a wireless manner, e.g., using Bluetooth, Infrared Data Association (IrDA), Wi-Fi direct communication, and NFC.

Alternatively, the mobile terminal 100 may include at least one of the mobile communication module 120, the wireless LAN module 131, and the short range communication module 132 according to the performance thereof.

The multimedia module 140 includes the broadcasting communication module 141, the audio playback module 142, or the video play module 143.

Alternatively, the multimedia module 140 may include the audio play module 142, and the video play module 143, but not the broadcasting communication module 141. Further, the audio play module 142 and/or the video play module 143 of the multimedia module 140 may be included in the controller 110.

The camera module 150 includes the first camera 151 and the second camera 152 for photographing still images and videos under the control of the controller 110.

The controller 110 processes images input from the first and the second cameras 151 and 152, or images stored in the storage unit 175 on a frame-by-frame basis, and outputs an image frame, converted to be suitable for screen characteristics (a size, a definition, and a resolution) of the touch screen 190.

The GPS module 155 receives signals from a plurality of GPS satellites, and calculates a location of the mobile terminal 100. Alternatively, a WiFi Positioning System (WPS) module may be provided along with the GPS module 155, or any one of the GPS module 155 and the WPS module may be provided.

The input/output module 160 includes a plurality of buttons 161, the microphone 162, the speaker 163, the vibration motor 164, the connector 165, the keypad 166, and the earphone connecting jack 167. The input/output module 160 receives a user's input or informs the user of information. The input/output module 160 is not limited thereto, and as other examples of the input/output module 160, cursor controls such as a mouse, a track ball, a joystick, or cursor direction keys may be provided for information communication with the controller 110, and control a cursor movement on the touch screen 190.

The vibration motor 164 vibrates the mobile terminal 100 under the control of the controller 110, e.g., when a voice call or a video call is received from another device or in response to a user's touch on the touch screen 190.

The connector 165 is an interface for connecting the mobile terminal 100 with an external device (not shown) such as a data convertor or a power source (not shown). The mobile terminal 100 transmits data stored in the storage unit 175 of the mobile terminal 100 to the external device (not shown), or may receive data from the external device through a wired cable connected to the connector 165, under the control of the controller 110. The connector 165 provides seamless data transmission and reception to and from the external device, such as a data convertor.

The keypad 166 includes a physical keypad (not shown) formed in the mobile terminal 100, and/or a virtual keypad (not shown) displayed on the touch screen 190.

The sensor module 170 includes at least one sensor for detecting the state (a location, a point of a compass, and a movement) of the mobile terminal 100.

The storage unit 175 stores signals or data input and output to and from the mobile terminal 100. The storage unit 175 may also store a navigation program, a video call, a game, images for providing applications with various functions such as a time based alarm application and a Graphic User Interface (GUI) related to the applications to a user, user information, a document, databases or data related to a method of processing a touch input, background images (a menu screen and a standby screen) or operating programs necessary for driving the mobile terminal 100, and images having been photographed through the camera module 150. The storage unit 175 is a machine (for example, a computer) readable medium, such as a floppy disk, a flexible disk, a hard disk, a magnetic tape, a Compact Disc ROM (CD-ROM), an optical disk, a punch card, a paper tape, a RAM, a Programmable ROM (PROM), an Erasable PROM (EPROM), and a FLASH-EPROM.

The power supply unit 180 supplies power to a battery of the mobile terminal 100 under the control of the controller 110. Further, the power supply unit 180 may supply power, which is input to the mobile terminal 100 from an external power source, e.g., through a wired cable connected with the connector 165 or through a wireless manner using a wireless charging technology.

The touch screen 190 displays data input from the controller 110 to a user, and provides user interfaces corresponding to various services (for example, a phone call, data transmission, broadcasting, and photography) to a user. The touch screen 190 may transmit an analog signal corresponding to at least one touch input or hovering input for the GUI to the touch screen controller 195. The touch screen 190 may receive at least one input through a user input unit (for example, fingers and pens).

A pen (or stylus) 168 may be provided at a lower end of the mobile terminal 100, which may be withdrawn and detached from the mobile terminal 100 when being used.

Figure 2:
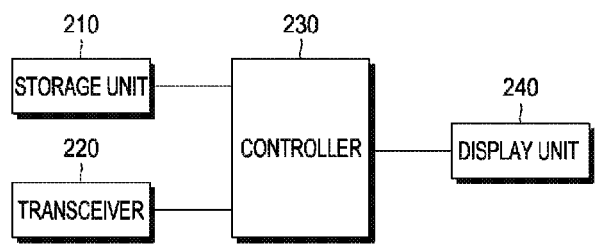
FIG. 2 illustrates a data transmission and reception apparatus of a mobile terminal according to an embodiment of the present invention.

FIG. 2 illustrates a data transmission and reception apparatus of a mobile terminal according to an embodiment of the present invention.

Referring to FIG. 2, the data transmission and reception apparatus of the mobile terminal includes a storage unit 210, a transceiver 220, a controller 230, and a display unit 240.

The blocks of FIG. 2 may perform the same functions as those of the blocks illustrated in FIG. 1.

For example, the transceiver 220 of FIG. 2 may include the mobile communication module 120, sub-communication module 130, and the GPS module 155, as illustrated in FIG. 1, and may include a module for transmitting and receiving data through various communication protocols such as an internet, a WiBro, and a WiFi, as well as various modules for providing communication with peripheral devices of the mobile terminal through a cable. Further, the transceiver 220 includes a module for transmitting and receiving data to and from a multipoint communication device such as conferencing equipment used in voice or video conference calls in a wired or wireless manner.

The storage unit 210 stores applications having various functions such as navigation, a voice call, a video call, and a game, images for providing a user interface related to these functions, user information, a document, databases or data related to a processing method of a touch input, and background images or operating programs necessary for driving the mobile terminal. The storage unit 210 may also store applications for providing multipoint voice calls and video calls.

The display unit 240 may include a touch screen displaying data to a user, providing a GUI corresponding to various services (for example, a phone call, data transmission, broadcasting, and photography) to the user, and receiving an analog signal corresponding to at least one touch input or hovering input for the GUI. The display unit 240 displays a popup window for asking a user whether or not to make multipoint video calls or informing that data transmitted and received to and from other mobile terminals is currently being shared with a plurality of users. Further, the display unit 240 displays data transmitted from a multipoint conference device, and receives a user's answer for whether or not to make the multipoint video calls.

The controller 230 controls or generates at least one of a series of channel connection, data transmission/reception, vibration for informing of the data transmission/reception, a sound, and a popup window, and controls a connection with a device for providing multipoint communication. Further, when a request for data sharing is received, the controller 230 may temporarily store the currently transmitted data in a buffer, and then may transmit the data to other mobile terminals. Further, in order to share data transmitted and received to and from other mobile terminals, the controller 230 reads and activates a data sharing application stored in the storage unit 210, analyzes the command input to the executed data sharing application, and transmits the analyzed results through the transmitter/receiver 220.

Figure 3A:
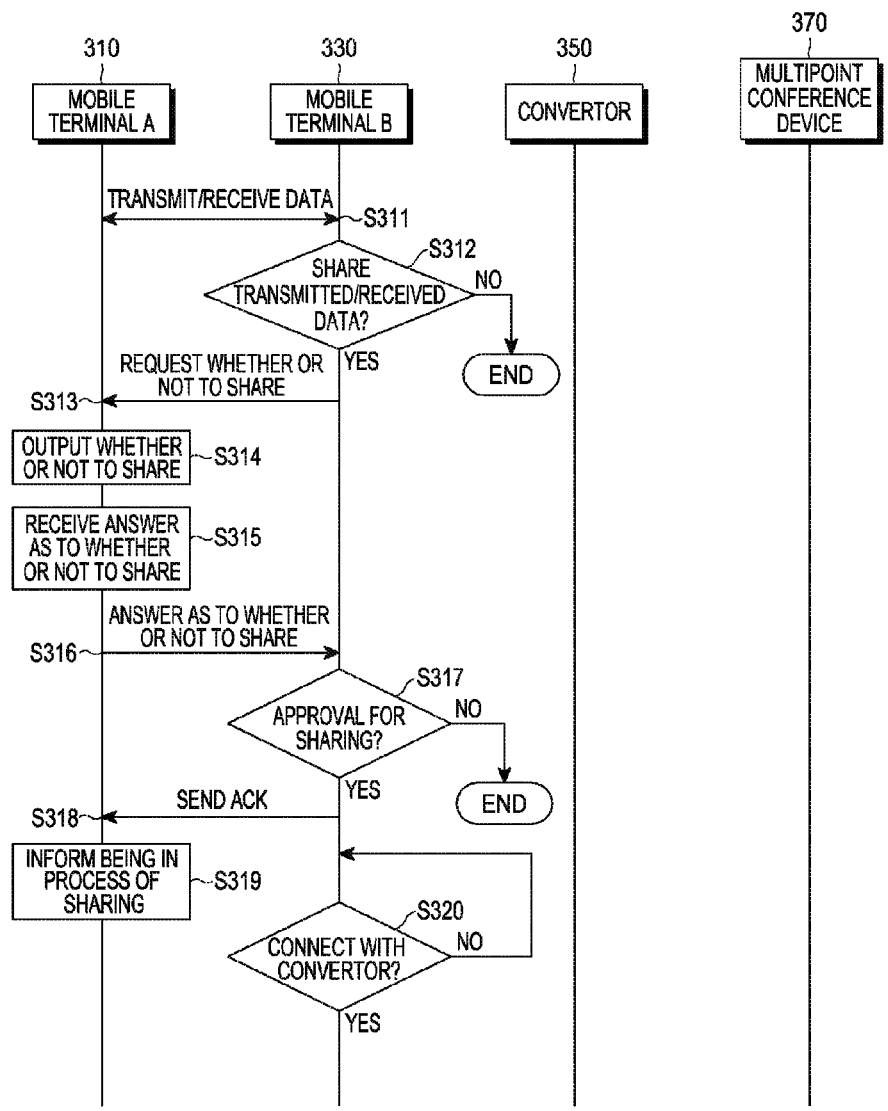
FIGS. 3A and 3B are signal flow diagrams illustrating a method of providing multipoint data transmission and reception according to an embodiment of the present invention.
Figure 3B:
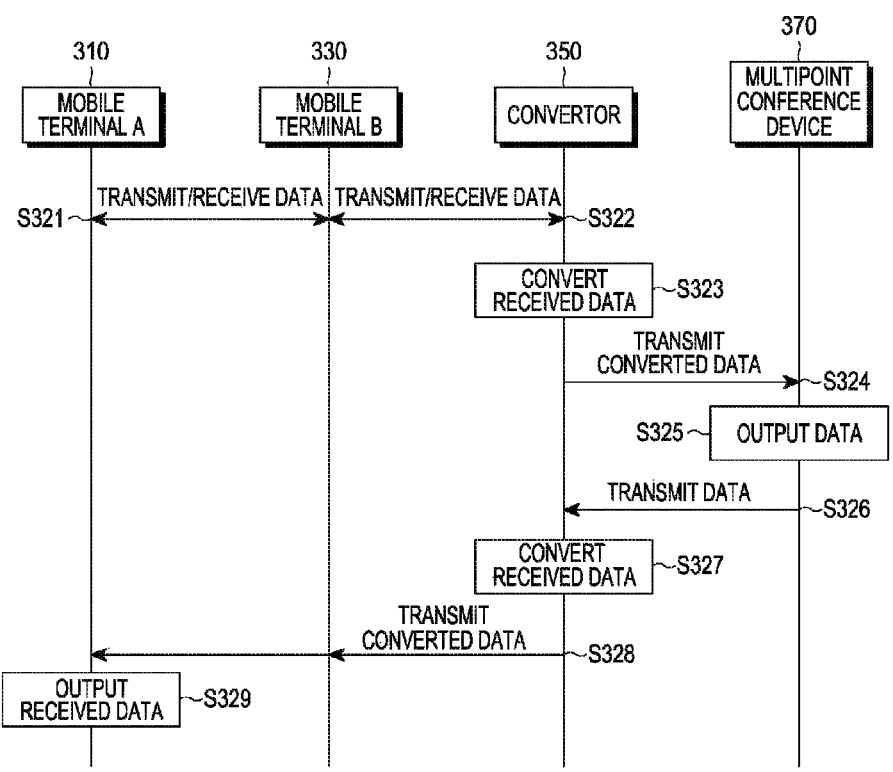

FIGS. 3A and 3B are signal flow diagrams illustrating a method of providing multipoint data transmission and reception according to an embodiment of the present invention.

Referring to FIG. 3A, when a communication channel is formed between a mobile terminal A 310 and a portable terminal B 330, at least one of a voice call, a video call, and data transmission and reception is performed in step S311. The mobile terminal B 330 is in a conference with a plurality of people, and the mobile terminal A 310 may be geographically far away from the mobile terminal B 330.

When the mobile terminal B wants to share data transmitted and received to and from the portable terminal A 310 with surrounding people in step S312, the mobile terminal B transmits an inquiry as to whether or not to share data to the mobile terminal A 310 in step S313. The inquiry as to whether or not to share the data may be transmitted through execution of a data sharing application having been stored in advance. Alternatively, a user is inquired as to whether or not to share the data when a popup window is displayed to the user, and then the result may be transmitted.

The mobile terminal A 310 receives the inquiry as to whether or not to share the data transmitted/received to/from the mobile terminal B 330, and informs the user of that in step S314. Although methods for informing the user include a voice output, a popup window display, and a vibration, other methods may be used for informing the user.

When receiving an answer as to whether or not to share the data from the user in step S315, the mobile terminal A 310 transmits the answer to the mobile terminal B 330 in step S316. The answer may be approval or disapproval for the sharing.

When the mobile terminal B 330 receives the approval for the sharing in step S317, the mobile terminal B 330 sends an ACK to the mobile terminal A 310 in step S318, and informs the user that the mobile terminal A 310 has approved the sharing of data transmission/reception with the mobile terminal B 330. However, when the mobile terminal B 330 receives the disapproval for the sharing from the mobile terminal A 310, the mobile terminal B 330 cancels a data sharing application being currently executed.

In step S320, the mobile terminal B 330 identifies whether or not the mobile terminal B 330 connects with a data convertor 350, which may be in the same geographical space or may be far away, in a wired/wireless manner. There may be several wired/wireless connections such as a cable, WiFi, an infrared ray, NFC, or Bluetooth, and it is obvious that all communication methods and communication mediums transmitting and receiving data in addition to the above-described connection methods are applied to the present invention.

When the mobile terminal B 330 is connected to the convertor 350 through a channel for data transmission/reception in step S320, the mobile terminal B 330 forwards the data received from the mobile terminal A 310 to the convertor 350, or transmits the data received from the convertor to mobile terminal A 310 in step S321 or S322.

In step S323, the convertor 350 analyzes the data from the mobile terminal B 330 and converts the analyzed types of received data. The data is converted to be suitable for ports of input/output terminals which are connected to a multipoint conference device 370 in a wired/wireless manner to transmit and receive data. For example, when the data received from the mobile terminal A 310 corresponds to voice data, the received voice data is converted into a voice to be output through a speaker of the multipoint conference device, and is transferred to the multipoint conference device 370 through the input and output terminals, and when the data received from the mobile terminal A 310 corresponds to video data, the received video data is converted to be output through a display device of the multipoint conference device, and is transferred to the multipoint conference device 370 through video input/output terminals in step S324.

In step S325, the multipoint conference device 370 outputs data received from the convertor 350 through a corresponding port according to types of converted data. Data to be transferred to the mobile terminal A 310 may be input to the multipoint conference device 370. In this way, the input data includes the voice data and the video data, although the present invention is not limited thereto.

In step S326, the multipoint conference device 370 transfers the input data to the convertor 350. Thereafter, the convertor 350 converts the received data, in step S327, such that the received data is suitable for the ports of the input/output terminals of the mobile terminal B 330, and transmits the converted data to the mobile terminal B 330 in step S328. In step S329, the mobile terminal B 330 forwards the converted data to the mobile terminal A 310.

Figure 4:
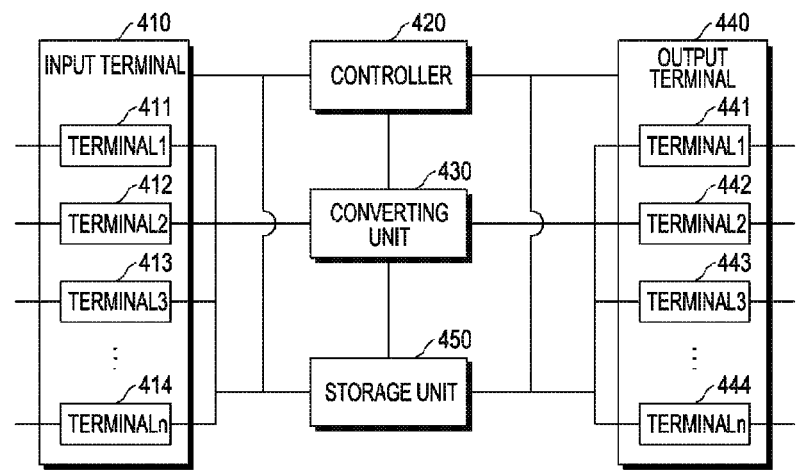
FIG. 4 illustrates a data converting device for providing data transmission and reception between a mobile terminal and a multipoint communication device according to an embodiment of the present invention.

FIG. 4 illustrates a data converting device providing data transmission and reception between a mobile terminal and a multipoint communication device according to an embodiment of the present invention.

Referring to FIG. 4, the data converting device includes an input terminal 410 receiving one or more types of data from the mobile terminal, a converting unit 430 converting a plurality of data input through the input terminal 410 according to the types such that the plurality of data are suitable for port types of output terminals connected to a multipoint communication device, an output terminal 440 providing a wired/wireless connection interface between the multipoint communication device and a controller 420 controlling seamless data transmission/reception between the mobile terminal and the multipoint communication device, and a storage unit 450 temporarily and/or permanently storing the data transmitted and received between the mobile terminal and the multipoint communication device, and storing at least one IDentifier (ID) of the mobile terminal for the data transmission and reception between the mobile terminal and the multipoint communication device.

The input terminal 410 corresponds to an external interface for connection with an external device, i.e., a mobile terminal or a fixed terminal connected in a wired manner, and includes a plurality of terminals 411, 412, 413, and 414 according to types of transmitted and received data. For example, the input terminal includes a terminal for Voice over Internet Protocol (VoIP), a terminal for a home phone, and a terminal for the mobile terminal. The input terminal 410 connects with a network for performing conference calls, and all types of ports, such as a circuit switch or VoIP, through which voice call transmission/reception can be made, may be mounted to the input terminal. The data transmitted and received through the ports includes phone numbers, voice data, video data, SMSs, MMSs, applications, and a plurality of programs. However, data is not limited to the above-described data types, and various types of data transmitted and received to and from the mobile terminal are applied to the present invention.

Each terminal of the input terminal may be connected to a connector 165 of the mobile terminal through a wired cable, or a wireless protocol such as an infrared ray and Bluetooth. For example, each terminal may be formed of various ports such as a LAN, a WAN, a RJ-11, and a RJ-12, and is connected to the mobile terminal, where data transmission/reception can be made, through the above-described ports in a wired/wireless manner. Each terminal or the input terminal 410 is connected to the converting unit 430 for converting the data transmitted and received through the each terminal into data for output through the corresponding terminal of the output terminal as well.

The converting unit 430 converts data input through the input terminal 410 into data of a communication method suitable for the ports of the output terminal. That is, the converting unit 430 converts the data input to the input terminal into data suitable for a type of an arbitrary terminal among terminals 441, 442, 443, and 444 of the output terminal to which a conference device is connected, and transmits the converted data to the output terminal. The converting unit 430 may include a Multiplexing (MUX) function and a Demultiplexing (DEMUX) function, and may determine types of data input to the input terminal That is, the converting unit 430 determines whether or not the input data corresponds to a call set-up data or a busy data. When the input data corresponds to a call set-up signal, the converting unit 430 selects the highest quality and a low cost network among the voice call protocols currently connected to the input terminal, and readjusts the call set-up. Alternatively, when the input data corresponds to a voice signal, the converting unit 430 converts the voice signal into a signal in a way currently connected to the output terminal, and transmits the converted data to the output terminal.

The storage unit 450 may temporarily and/or permanently store the data transmitted/received between the mobile terminal and the multipoint communication device, and may store an ID of at least one mobile terminal for data transmission and reception, and a control program or an application for control of the mobile terminal or the controller 420.

When receiving a request for an ID or identification information of the mobile terminal from the multipoint communication device, the storage unit 450 searches for the identification information of the at least one mobile terminal which has been stored in the storage unit 450, and transmits the identification information of the corresponding mobile terminal through the output terminal.

The controller 420 controls the input terminal 410, the output terminal 440, the converting unit 430, and the storage unit 450. The controller 420 determines types of data input through the each terminal of the input terminal, and controls the converting unit 430 according to the determined result to provide a data conversion command to the converting unit 430. That is, the controller 420 determines whether or not the data input through the input terminal corresponds to a call set-up signal, or a busy signal. When the input data corresponds to the call set-up signal, the controller 420 selects the highest quality and a low cost network among the voice call protocols currently connected to the input terminal, and readjusts the call set-up. Alternatively, when the input data corresponds to the voice signal, the controller 420 converts the voice signal into a signal in a way currently connected to the output terminal, and transmits the converted data to the output terminal. Therefore, in order to provide the data conversion command, the controller 420 may include an algorithm for determining types of transmitted/received data, and may temporarily store the transmitted/received data in a buffer.

When the ID of the mobile terminal and a phone number that a user wants to call are received from the multipoint communication device, the controller 420 searches for IDs of a plurality of mobile terminals which have been stored in the storage unit 450 in advance to determine whether or not the ID of the mobile terminal is available, and as a determined result, when it is determined that the ID of the mobile terminal is available, attempts to call the received phone number. The controller 420 transmits, in real time, a call signal generated during a phone connection, and voice data or video data generated during a phone call to the multipoint communication device.

The output terminal 440 corresponds to an external interface for connection with an external device, i.e., a multipoint communication device, and includes a plurality of terminals 411, 412, 413, and 414 according to types of data transmitted and received to and from the multipoint communication device. Each of the terminals may be connected with the ports of the multipoint communication device through a wired cable, or a wireless protocol such as an infrared ray and Bluetooth. For example, each terminal may be formed of various ports such as a LAN, a WAN, a RJ-11, and a RJ-12, and may be connected to the multipoint communication device, where data transmission and reception can be made, through the above-described ports in a wired/wireless manner.

Each terminal or the output terminal 440 is connected to the converting unit 430 for converting the data transmitted/received through the each terminal into data for an output through the corresponding terminal of the input terminal 410 as well. All types of ports used in multipoint communication devices may be mounted to the output terminal.

Figure 5:
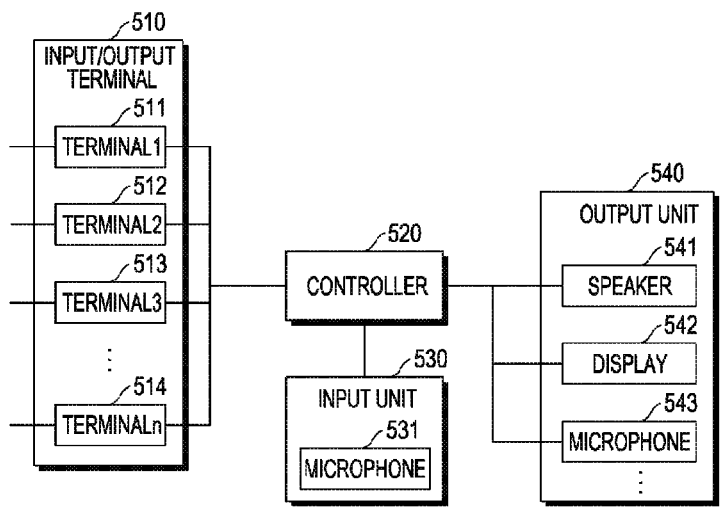
FIG. 5 illustrates a multipoint communication device for displaying data transmitted and received to and from a mobile terminal according to an embodiment of the present invention.

FIG. 5 illustrates a multipoint communication device for displaying data transmitted and received to and from a mobile terminal according to an embodiment of the present invention.

Referring to FIG. 5, the multipoint communication device includes an input/output terminal 510 forming a wired/wireless interface through a data convertor and at least one port according to the present invention, and transmitting and receiving data to and from the data convertor, an input unit 530 receiving a command from a user, an output unit 540 outputting the data received from the data convertor, and a controller 520 controlling data transmission and reception to and from the data convertor, and controlling the input/output terminal 510, the input unit 530, and the output unit 540.

The input/output terminal 510 includes a plurality of terminals 511, 512, 513, and 514. The input/output terminal 510 may be formed of the same number of terminals as the output terminal 440 of the data convertor, or may be formed with a different number of terminals than the output terminal 440 of the data convertor. Each of the terminals is formed of the same port as the terminal of the output terminal 440 of the data convertor. The input/output terminal 510 transmits and receives data through the corresponding port according to types of data under the control of the controller 520.

The input unit 530 receives a command from a user, e.g., though a keypad, a touch screen, and/or a pen. The input command includes at least one of a phone number, an ID of a mobile terminal, and execution, deletion, or renewal of an application in the mobile terminal, and is transmitted to the controller 520.

The output unit 540 outputs data received from the data convertor to the corresponding output device according to the types of output units, and includes a speaker 541 outputting a voice, and a display 542 displaying an image. Further, the output unit 540 includes a microphone 543 receiving a voice of a user. Video data, voice data, applications, and programs output from the output unit 540 are displayed to a plurality of users.

The controller 520 controls the input/output terminal 510, the input unit 530, and the output unit 540. More specifically, the controller 520 analyzes the data transmitted and received through the input/output terminal 510, to output the analyzed result to the corresponding device of the output unit 540. Further, the controller 520 converts the voice data input from the microphone 543, such that the voice data is suitable for the port or the transmission method of the corresponding terminal of the input/output terminal 510, and then transmits the converted data through the input/output terminal 510.

When a command is input through the input unit 530, the controller 520 transmits the command to the data convertor, and when receiving data corresponding to the command from the data convertor, the controller 520 transmits the received data to the output device of the corresponding output unit 540.

For example, when a user inputs his own identifier (e.g., an ID of a mobile terminal) and a phone number that the user wants to call through the input unit 530, in order to attempt to call through a multipoint communication device, the identifier and the phone number are transferred to the output terminal 440 of the data convertor through the input/output terminal 510 under the control of the controller 520. Thereafter, the data convertor determines whether or not the received identifier corresponds to an authenticated identifier. As a determined result, when the received identifier corresponds to the authenticated identifier, a call is attempted to the received phone number, and a call connection tone and a busy data or video data is transmitted to the multipoint communication device. The multipoint communication device seamlessly outputs the call connection tone, the voice data, and the video data, which are received from the data convertor, through the output unit 540 in real time.

FIGS. 6A to 6D illustrate an example a mobile terminal connecting with a data convertor to share data with a plurality of users, while transmitting and receiving data to and from another mobile terminal, according to an embodiment of the present invention.

Figure 6A:
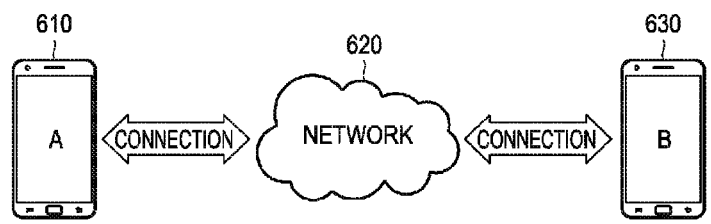
FIGS. 6A to 6D illustrate an example a mobile terminal connecting with a data convertor to share data with a plurality of users, while transmitting and receiving data to and from another mobile terminal, according to an embodiment of the present invention.

Referring to FIG. 6A, a mobile terminal A 610 is making a voice call or a video call with a mobile terminal B 630. Alternatively, the mobile terminal A 610 may be transmitting and receiving data to and from the mobile terminal B 630.

While the mobile terminal B 630 makes the phone call with the mobile terminal A 610, or transmits and receives the data to and from the mobile terminal A 610 through a network 620, a user of the mobile terminal B 630 may want to share a current phone call or currently transmitted and received data with users surrounding himself through a voice output or a video output.

Figure 6B:
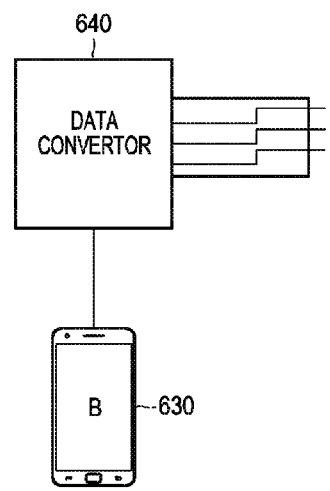

Referring to FIG. 6B, the mobile terminal B 630 transmits a request for sharing, sends an ACK for an approval of the sharing request to the mobile terminal A 610, when receiving an approval message for the sharing request from the mobile terminal A 610, and is connected with a data convertor 640 during the phone call or the data transmission/reception.

Figure 6C:
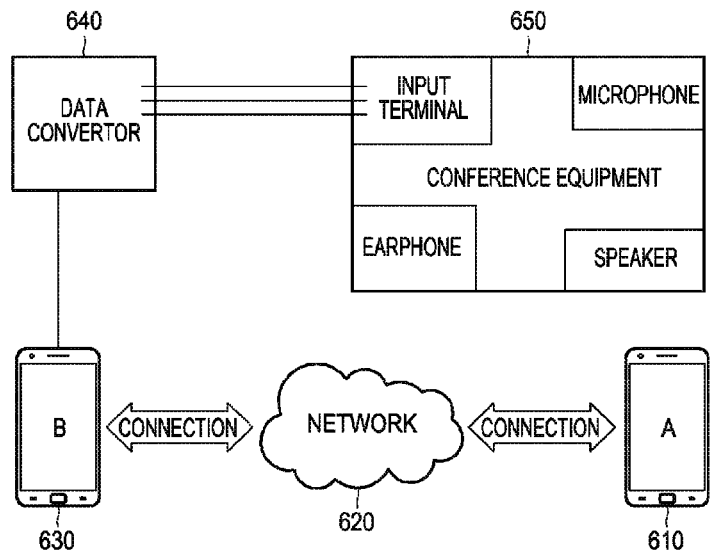

Referring to FIG. 6C, the mobile terminal A 610 is connected to the data convertor 640 and a multipoint communication device 650 through a mobile communication network or the network 620, and the mobile terminal B 630. A channel is formed between the mobile terminal A 610 and the multipoint communication device 650, in which case the mobile terminal A 610 can transmit and receive data to and from the multipoint communication device 650 through such a channel as described above.

Figure 6D:
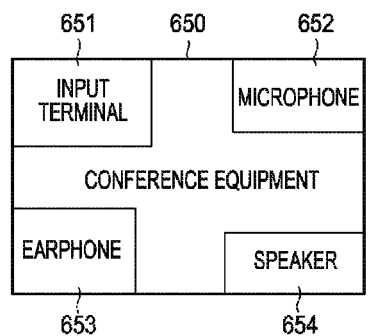

Referring to FIG. 6D, the multipoint communication device 650 is connected to the data convertor in a wired/wireless manner through different ports or protocols according to types of data. When the mobile terminal B and the data convertor are connected to each other, the multipoint communication device activates at least one of output devices such as a microphone 652, a speaker 654, an earphone 653, and an image display device. When the output device is activated, the data received from the data convertor through an input terminal 651 is output through the corresponding output device. Various types of commands or data including voice data input through the microphone are transmitted anew to the data convertor.

FIGS. 7A to 7F illustrate an example of attempting a voice call using a multipoint communication device, according to an embodiment of the present invention.

Figure 7A:
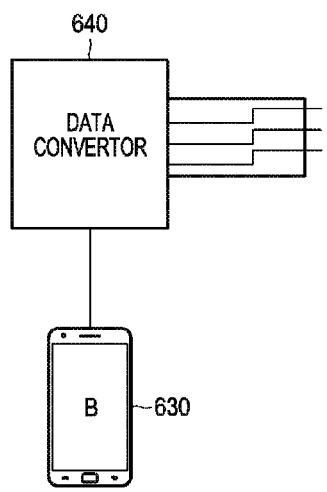
FIGS. 7A to 7F illustrate an example of attempting a voice call using a multipoint communication device, according to an embodiment of the present invention.

Referring to FIG. 7A, a mobile terminal B 630 is connected to a data convertor 640. When a user wants to share data transmitted and received between the mobile terminal B 630 and a mobile terminal A 610 with people around the mobile terminal B 630, the mobile terminal B 630 is connected to a data convertor 640. When such a connection as described above is set, the mobile terminal B 630 may enter a phone mode for a conference, that is, a multipoint call mode.

Figure 7B:
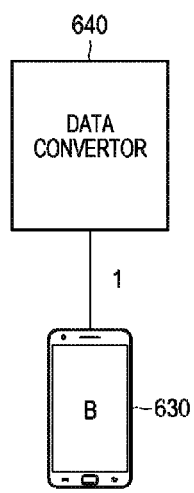

Referring to FIG. 7B, for the phone call or the data transmission/reception between the mobile terminal B and the mobile terminal A, when a phone number of the mobile terminal A 610 is input to the mobile terminal B 630 so that a phone call is attempted, or a connection for data transmission/reception is set, the mobile terminal B 630 transmits a call connection signal generated during the phone call or the data transmission/reception to the data convertor 640 (Process 1 of FIG. 7B).

Figure 7C:
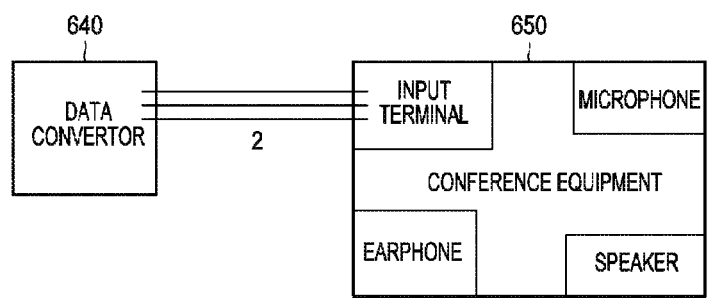

Referring to FIG. 7C, the data convertor 640 forwards the call connection signal received from the mobile terminal B 630 to the multipoint communication device 650 (Process 2). The data convertor 640 and the multipoint communication device 650 may form at least one wired/wireless communication channel. The data convertor 640 may transmit the signal or data, which have been received from the mobile terminal B 630, to the multipoint communication device 650 through channels, different from each other, according to the type of signal or data. An output unit of the multipoint communication device 650 includes at least one of an earphone, a speaker, a screen, and a display device.

Figure 7D:
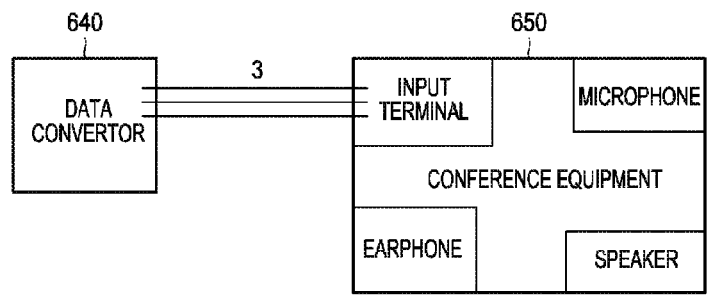

Referring to FIG. 7D, the call connection signal transferred to the multipoint communication device 650 is modulated for a high quality and a low cost land line, or other communication to be transferred to the data convertor (Process 3).

Figure 7E:
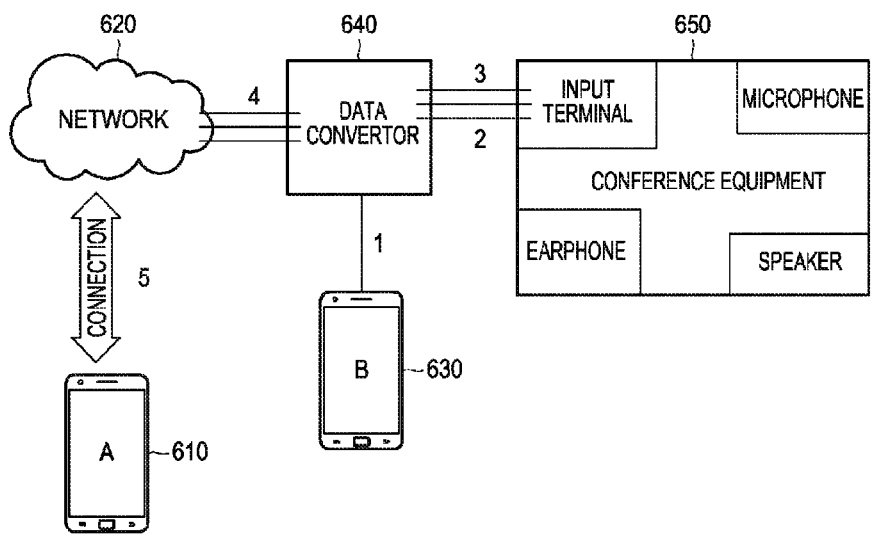

Referring to FIG. 7E, the signal transferred to the data convertor 640 is transferred to the mobile terminal B 630 though a network (Processes 4 and 5). Through the above-described processes, the data transmission/reception is made between the mobile terminal B 630 and the multipoint communication device 650. For example, a user of the mobile terminal B 630 can make a seamless voice call with the plurality of people around the mobile terminal A 610 through the speaker and the microphone of the multipoint communication device 650.

Figure 7F:
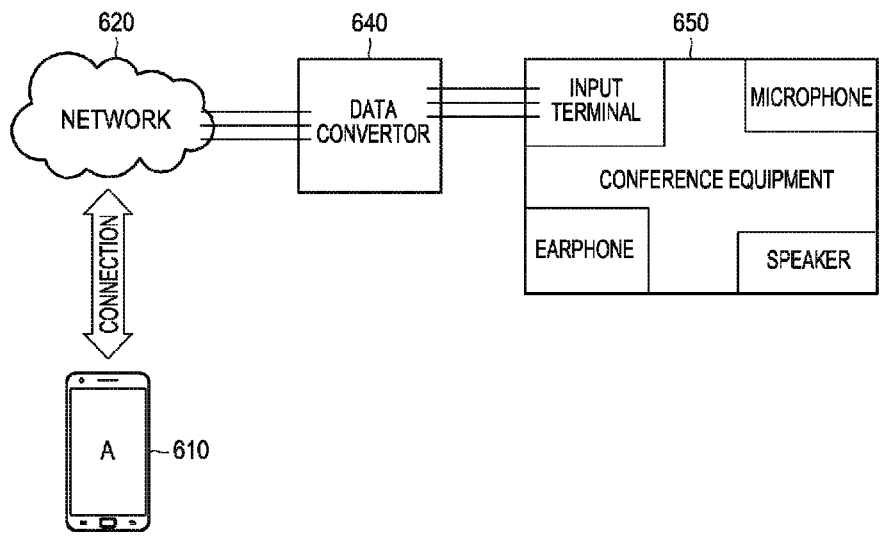

Referring to FIG. 7F, data transmission and reception is made between the mobile terminal A 610 and the data convertor 640 through the network 620.

The above-described embodiments of the present invention are realized in a form of hardware, software, or a combination of hardware and software. The software can be stored in, for example, irrespective of being erasable or rewritable, a volatile storage device, a non-volatile storage device such as a ROM, a memory such as a RAM, a memory chip device, and an integrated circuit, an optically or magnetically recordable and machine (for example, a computer) readable storage medium such as a CD, a Digital Versatile Disc (DVD), a magnetic disk, and a magnetic tape. It can be seen that a memory that may be included in the mobile terminal corresponds to an example of the storage medium suitable for storing a program or programs including instructions by which the embodiments of the present invention are realized. Accordingly, embodiments of the present invention may include a program that includes a code for realizing a device and a method described in the present specification, and a storage medium which stores such a program, as described above, and is machine (computer) readable. Moreover, such a program, as described above, can be electronically transferred through an arbitrary medium such as a communication signal transferred through cable or wireless connection, and the present invention properly includes the things equivalent to that.

Moreover, the above-described mobile terminal can receive a program from a program provision device, which is connected thereto in a wired or wireless manner, and store the program.

The program provision device may include a program including instructions which allows performing of data transmission and reception of the mobile terminal, a memory or a storage unit for storing information necessary for the data transmission and reception, a communication unit for performing wired or wireless communication with the mobile terminal, and a controller for transmitting a corresponding program to a host device in response to a request of the mobile device or automatically.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for data transmission and reception of a mobile terminal, the method comprising:
    detecting a multi-point conference device being connected with the mobile terminal via a sharing device;
    receiving first voice data through a voice communication channel between the mobile terminal and another mobile terminal;
    providing first data including the first voice data, to be output by the multi-point conference device, to the multi-point conference device via the sharing device;
    receiving second voice data acquired by the multi-point conference device, from the multipoint conference device, via the sharing device;
    transmitting second data including the second voice data through the voice communication channel to the another mobile terminal;
    executing a data sharing application for sharing data with the another mobile terminal;
    requesting data sharing, based on the executed data sharing application to the another mobile terminal, for sharing the data transmitted and received to and from the another mobile terminal performing voice communication with the mobile terminal:
    receiving a response of the request for the data sharing from the another mobile terminal;
    establishing a channel connection between the mobile terminal and the sharing device for sharing the data;
    canceling the executed data sharing application if the response is a disapproval of the request; and
    informing of sharing with the another mobile terminal if the response is an approval of the request,
    wherein the first data transmitted to the multi-point conference device is converted to a data format suitable for an output port of the multi-point conference device, and outputted to a plurality of users.

2. The method of claim 1, wherein requesting the data sharing to the another mobile terminal comprises:
    activating a module for data sharing with the another mobile terminal by using the executed data sharing application; and
    transmitting a request for the data sharing.

3. The method of claim 2, wherein receiving the approval of the request for the data sharing from the another mobile terminal comprises receiving an approval message in response to the request for the data sharing.

4. The method of claim 1, wherein transmitting the second data comprises relaying the second data to the another mobile terminal.

5. The method of claim 1, wherein the sharing device determines a type of the first data received from the mobile terminal, converts the determined type of the first data into a data format suitable for a port of an output terminal, and outputs the converted data to a plurality of users.

6. The method of claim 1, further comprising informing a user of the mobile terminal of data sharing with the another mobile terminal.

7. An apparatus for data transmission and reception of a mobile terminal, the apparatus comprising:
    a transceiver; and
    a controller configured to:
    detect a multi-point conference device being connected with the mobile terminal via a sharing device,
    receive first voice data through a voice communication channel between the mobile terminal and another mobile terminal,
    provide first data including the first voice data, to be output by the multi-point conference device, to the multi-point conference device, via the sharing device,
    receive second voice data acquired by the multi-point conference device, from the multi-point conference device via the sharing device,
    transmit second data including the second voice data through the voice communication channel to the another mobile terminal,
    execute a data sharing application for sharing data with the another mobile terminal,
    request data sharing based on the executed data sharing application to the another mobile terminal, for sharing the data transmitted and received to and from the another mobile terminal performing voice communication with the mobile terminal,
    receive a response of the request for the data sharing from the another mobile terminal,
    establish a channel connection between the mobile terminal and the sharing device for sharing the data,
    cancel the executed data sharing application if the response is a disapproval of the request, and
    inform of sharing with the another mobile terminal if the response is an approval of the request,
    wherein the first data transmitted to the multi-point conference device is converted to a data format suitable for an output port of the multi-point conference device, and outputted to a plurality of users.

8. The apparatus of claim 7, wherein the controller is further configured to activate a module for data sharing with the another mobile terminal by using the executed data sharing application, and
    wherein the transceiver is further configured to transmit a request for the data sharing.

9. The apparatus of claim 8, wherein the transceiver is further configured to receive an approval message, in response to the request, the approval message including a command as to whether or not to share the data.

10. The apparatus of claim 7, wherein the transceiver is further configured to relay the second data to the another mobile terminal.

* * * * *